(12) United States Patent
Wey

(10) Patent No.: US 6,755,209 B2
(45) Date of Patent: Jun. 29, 2004

(54) FILL VALVE ASSEMBLY FOR A FLUSH TANK

(75) Inventor: Paul Wey, Eschenbach (CH)

(73) Assignee: Geberit Technik AG, Jona (CH)

( * ) Notice: Subject to any disclaimer, the term of this patent is extended or adjusted under 35 U.S.C. 154(b) by 0 days.

(21) Appl. No.: 10/171,483

(22) Filed: Jun. 13, 2002

(65) Prior Publication Data

US 2003/0230345 A1 Dec. 18, 2003

(51) Int. Cl.[7] ..................... F16K 31/34; F16K 31/385; F16K 47/02
(52) U.S. Cl. ................. 137/414; 137/218; 137/426; 137/436; 137/437; 137/444; 138/41; 138/42
(58) Field of Search ................. 137/414, 426, 137/436, 437, 442, 443, 444, 218, 550; 138/37, 42, 41, 43; 251/126, 127, 217

(56) References Cited

U.S. PATENT DOCUMENTS

| | | | | |
|---|---|---|---|---|
| 3,107,747 A | * | 10/1963 | Parkison | 137/441 |
| 3,516,094 A | * | 6/1970 | Reagan | 137/217 |
| 5,255,703 A | * | 10/1993 | Johnson | 137/414 |
| 5,280,803 A | * | 1/1994 | Swift et al. | 137/414 |
| 5,594,959 A | | 1/1997 | Nichols-Roy et al. | |
| 5,623,961 A | | 4/1997 | Nichols-Roy | |
| 5,715,859 A | * | 2/1998 | Nichols-Roy | 137/426 |
| 5,738,141 A | * | 4/1998 | Blanke et al. | 137/414 |
| 5,836,346 A | * | 11/1998 | Nichols-Roy | 137/414 |
| 5,964,247 A | * | 10/1999 | Johnson | 137/414 |
| 6,003,541 A | * | 12/1999 | Nichols-Roy | 137/414 |
| 6,155,288 A | | 12/2000 | Johnson | |
| 6,260,574 B1 | * | 7/2001 | Nichols-Roy | 137/414 |
| 6,354,326 B1 | * | 3/2002 | Le et al. | 137/436 |

FOREIGN PATENT DOCUMENTS

| | | | | |
|---|---|---|---|---|
| AU | 459533 B | | 3/1975 | |
| DE | 22 41 763 A | | 3/1974 | |
| EP | 0369404 | * | 5/1990 | 137/414 |

* cited by examiner

Primary Examiner—George L. Walton
(74) Attorney, Agent, or Firm—Browdy and Neimark, P.L.L.C.

(57) ABSTRACT

The fill valve incorporates a housing (8) that has a vertical water-carrying channel (24) that leads from an inlet (49) to be fastened on the flush tank bottom (2) to a float-controlled diaphragm valve (50). The diaphragm valve (50) incorporates in a diaphragm (43) a passage for the pressure equalization between a first chamber (51) in front of the diaphragm (43) and a second chamber (52) behind the diaphragm (43). To actuate the diaphragm valve (50) a pilot valve (58) is provided. The diaphragm valve (50) is disposed laterally on the housing (8), thus permitting a low overall height.

13 Claims, 6 Drawing Sheets

FILL VALVE ASSEMBLY FOR A FLUSH TANK

BACKGROUND OF THE INVENTION

1. Technical Field of the Invention

The invention relates to a fill valve assembly for a flush tank, having a housing that incorporates a vertical water-carrying channel that leads from an inlet that is to be fastened on the bottom of the flush tank to a float-controlled diaphragm valve that incorporates in the diaphragm a passage for the pressure equalization between a first chamber in front of the diaphragm and a second chamber behind the diaphragm, and having a pilot valve for actuating the diaphragm valve.

2. Prior Art

A fill valve assembly of the above type has become known in the prior art from U.S. Pat. No. 6,155,288. It is connected at an inlet connection piece to the bottom of the flush tank and incorporates a float-controlled diaphragm valve. After a flushing operation a float drops down and, via the pilot valve, opens the diaphragm valve. When the diaphragm valve is open, water flows vertically up to the valve seat of the diaphragm valve, which is located in a horizontal plane. After the valve seat, the water is guided down via a channel system into the flush tank and refills the same. A portion of the water after the valve seat is guided through a pipe to the trap of the toilet bowl to refill the trap. This refilling of the trap is required with so-called siphon traps. This is explained in more detail, for example, in U.S. Pat. No. 5,594,959.

A fill valve assembly of the above type has also become known from U.S. Pat. No. 5,623,961. The diaphragm valve is disposed at the upper end of a housing. When the diaphragm valve is open, the water flows vertically up to the diaphragm, which is disposed in a horizontal plane, and flows in a horizontal plane radially out, and in a channel system vertically down into the flush tank to refill the same. To refill the trap, a connection piece is disposed on the housing, and a portion of the water flows through the same into the trap.

OBJECT AND SUMMARY OF THE INVENTION

The invention is based on the object to create a fill valve assembly of the above type that permits a quiet refilling of the flush tank while providing for a smaller overall height. It is a further object of the invention to create a fill valve assembly of the above type that permits a refilling of a siphon trap while providing for a smaller overall height. It is a further object of the invention to create a fill valve assembly of the above type whereby a backflow in case of a negative pressure in the supply line can effectively be prevented, and which is nonetheless simple in its design.

In the inventive fill valve assembly the diaphragm valve is disposed laterally on the housing. The water that flows vertically up into the housing is deflected by 90° and flows horizontally to the valve seat of the diaphragm valve. The lateral disposition of the diaphragm valve permits a significantly lower overall height of the fill valve assembly.

A particularly quiet filling is attained if, according to an improvement of the invention, the water, after passing the valve seat, flows into a rotation chamber, which extends in a horizontal plane. The water preferably flows into this rotation chamber tangentially.

According to an improvement of the invention means are disposed in the rotation chamber to prevent a backflow in case of a negative pressure. These are preferably designed such that when the diaphragm valve is open, the rotation chamber is open for the inflow of flushing water. During an inflow of air, however, this rotation is sealed off so that no water can enter from the flush tank into the pipe. According to a preferred embodiment the means are designed as a flap. In an improvement of the invention, this flap is fixed on the housing with a cover. This permits a particularly simple mounting and inspection.

Further advantageous characteristics will become apparent from the description below, as well as from the drawing.

BRIEF DESCRIPTION OF THE DRAWINGS

An embodiment of the invention will be explained in more detail below, based on the drawing in which.

DETAILED DESCRIPTION OF THE PREFERRED EMBODIMENT(S) OF THE INVENTION

Figure 1:
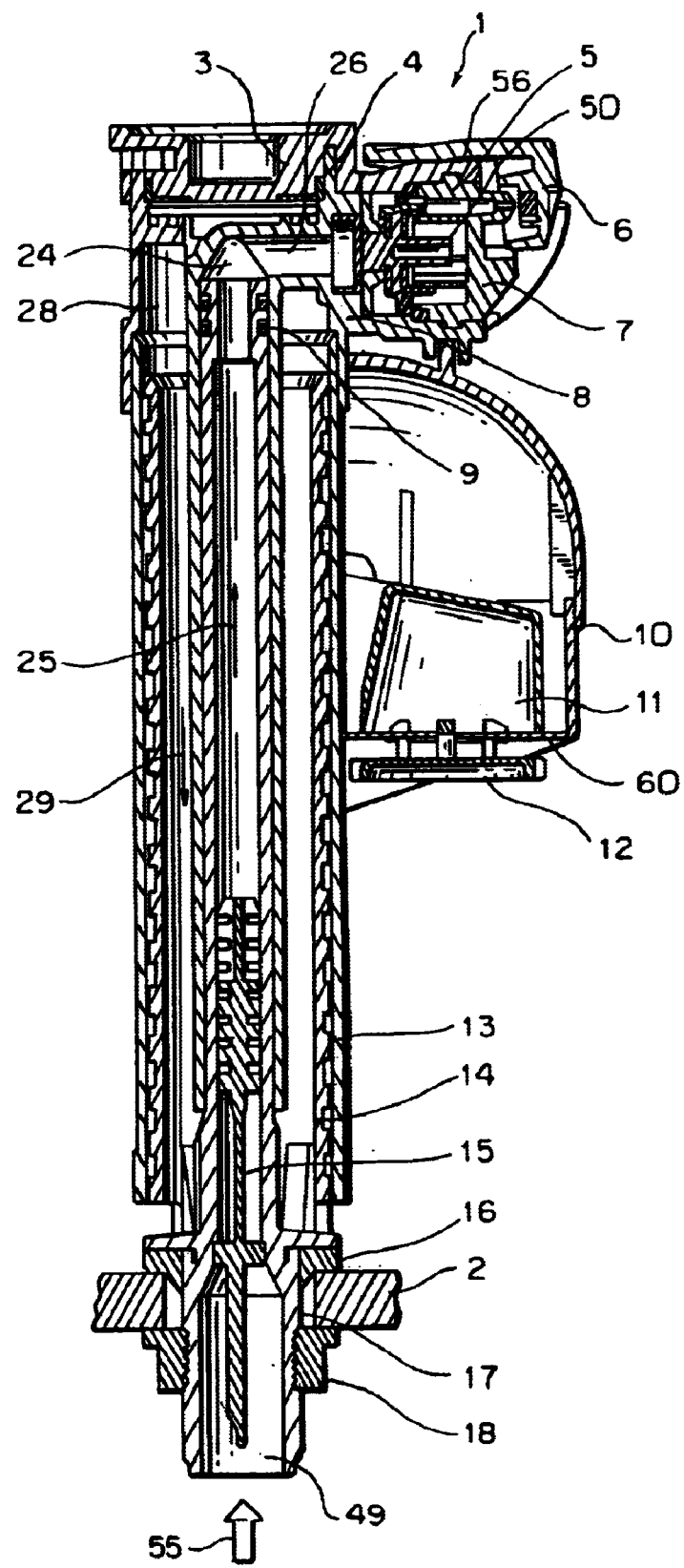
FIG. 1 shows a section through an inventive fill valve assembly.
Figure 2:
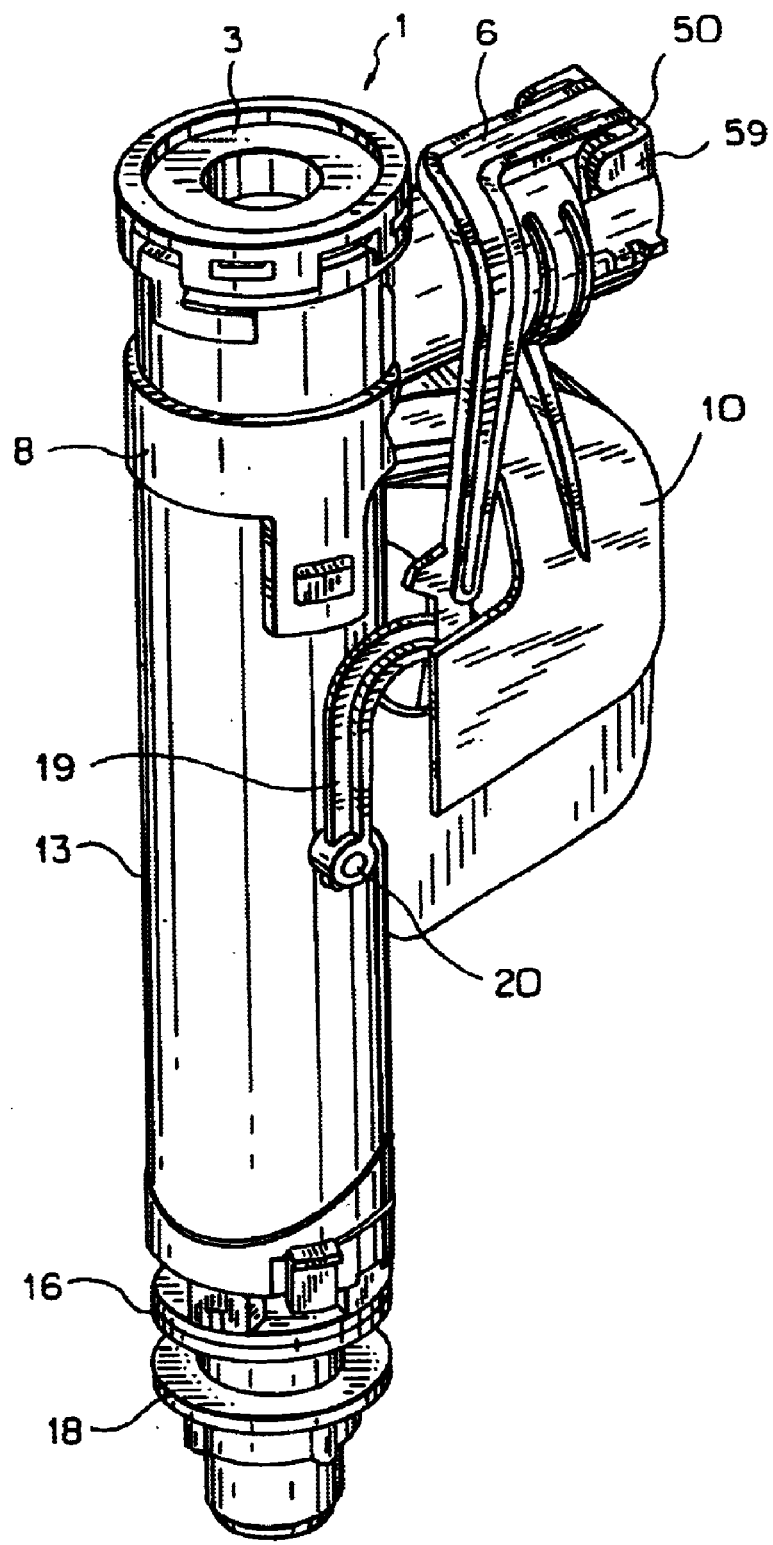
FIG. 2 shows a three-dimensional view of the fill valve assembly.
Figure 3:
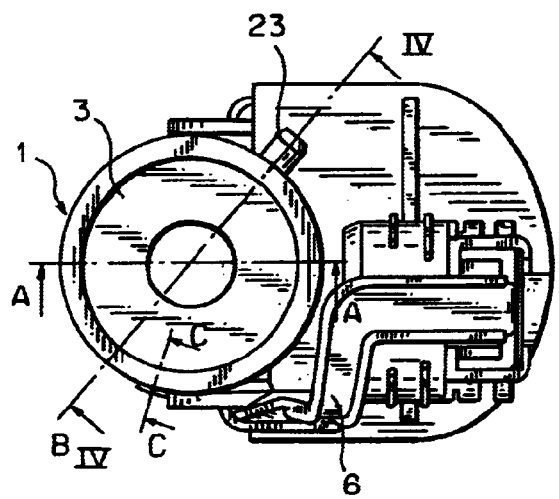
FIG. 3 shows a plan view of the fill valve assembly.
Figure 4:
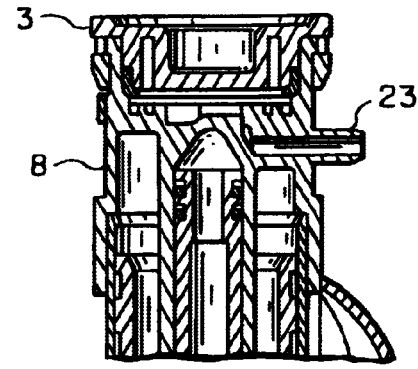
FIG. 4 shows a partial section along the line IV—IV in FIG. 3.

The fill valve assembly 1 shown in FIGS. 1 and 2 is fastened at its lower end with a seal 16 as well as a nut 18 on the bottom 2 of a flush tank that is not depicted further. The fill valve assembly 1 is connected at an inlet 49 that projects from the underside of the bottom 2 to a water line that is not shown here. The water is supplied in the direction of the arrow 55.

The fill valve assembly 1 incorporates a housing 8 that is preferably manufactured of plastic, and a vertical channel 24 into which an inlet pipe 17 has been inserted from the bottom. In this inlet pipe 17 a filter 15 is disposed whereby solids in the water are held back. The water that flows into the inlet pipe 17 at the inlet 49 enters through the filter 15 vertically up, as indicated by the arrow 25 in FIG. 1. The inlet pipe 17 is sealed against the housing 8 with sealing rings 9.

The inlet pipe 17 forms a channel 24 that leads at its upper end into a channel 26, which extends horizontally and leads into a connection piece 56 into which a diaphragm valve 50 has been inserted.

Figure 6:
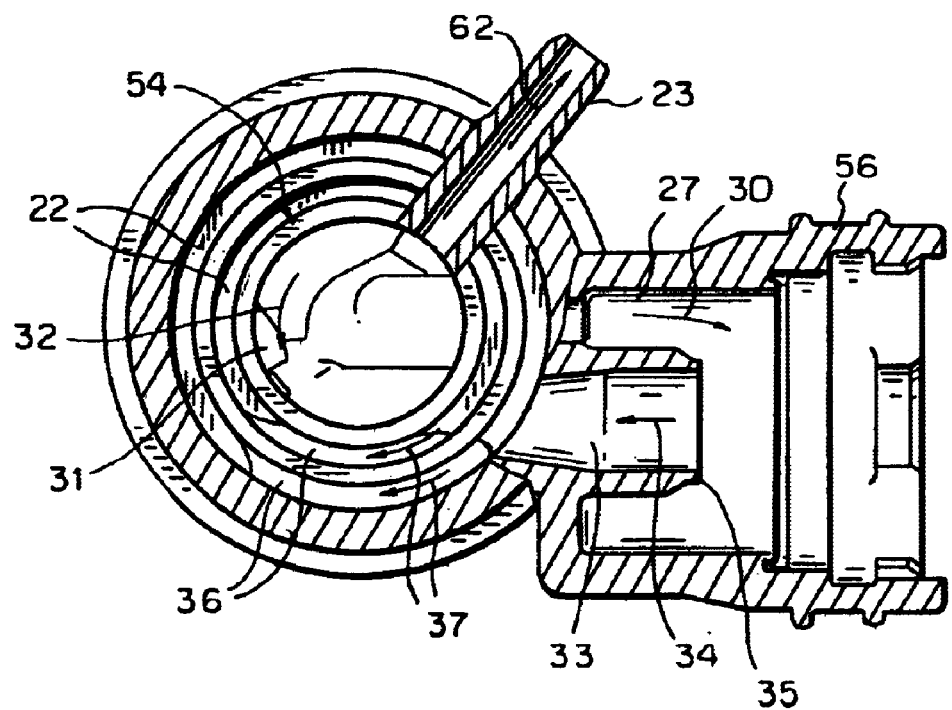
FIG. 6 shows a section along the line VI—VI in FIG. 5.
Figure 12:
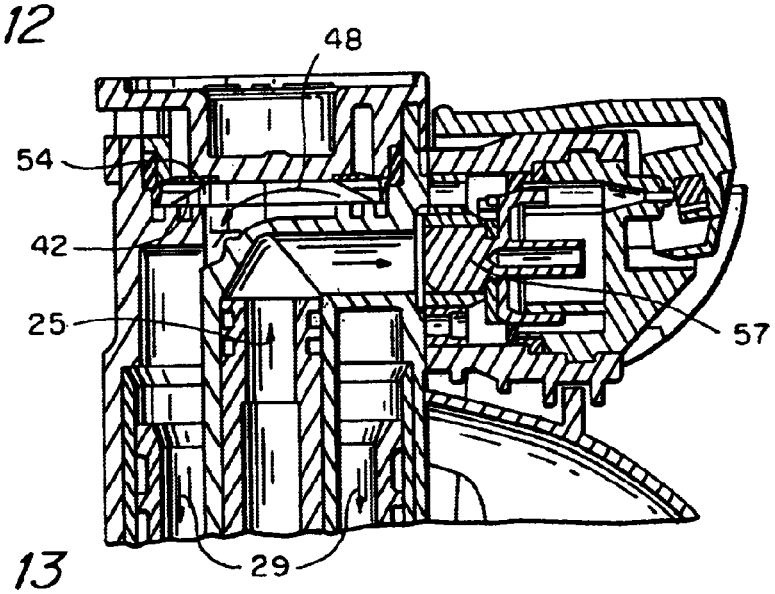

The diaphragm valve 50 has a diaphragm 43 that cooperates with a valve seat 35 (FIG. 6). The diaphragm 43 has, in a manner known per se, a passage that is not shown here, which connects a first chamber 51 in front of the diaphragm 43 to a chamber 52 behind the diaphragm 43. When the valve is closed, the pressure in the chamber 51 is thus the same as the pressure in the chamber 52. Since the surface area of the closing means (FIG. 12) in the chamber 52 is larger than in the chamber 51, the difference in pressure causes the closing means 57 to be pressed against the valve seat 35.

To actuate the diaphragm valve 50, a pilot valve 58 is provided that incorporates a passage 45 to the chamber 52, as well as a sealing means 46 that is fastened to a lever 6. This lever 6, according to FIG. 2, is pivotable around a horizontal axis 59 and connected to a float 11 that is disposed below a float cap 10. If the flush tank is filled with water, the float 11 experiences a buoyancy and the same acts via a lever 19 onto the lever 6 in a manner so that the sealing means 46 is pressed against the passage 45 and closes the same. A control float 12 also experiences a buoyancy and is resting against a cup 60. When the water level in the flush tank drops, the control float 12 drops down and the cup 60 is emptied. At the same time the float 11 sinks down and pivots the lever 19 around a horizontal axis 20, and also the lever 6, so that the sealing means 46 is lifted off the opening 45. This causes the pressure in the chamber 52 to drop and, as a result, the closing means 57 (FIG. 12) is lifted off the valve seat 35. The diaphragm valve 50 is thus open.

Figure 7:
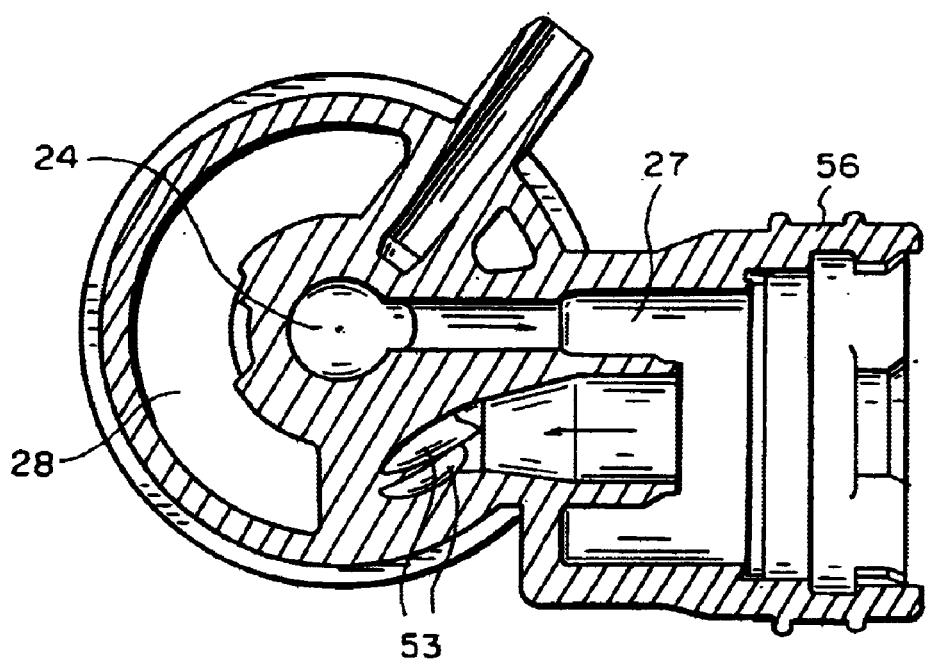
FIG. 7 shows a section along the line VII—VII in FIG. 5.

The chamber 51, which is designed annular and lies in a vertical plane, is formed, according to FIGS. 6 and 7, by a recess 27, in which the valve seat 35 is disposed approximately centrically. The latter, too, is located in a vertical plane. When the diaphragm valve 50 is open the water flows, according to FIG. 6, in the direction of the arrow 30 into the chamber 27. The water then passes the valve seat 35 and flows in the direction of the arrow 34 through channels 53, up into a rotation chamber 54, which has two circular grooves 36 that are open towards the top. The water thus flows through the channels 53 diagonally up and tangentially into the rotation chamber 54 and into the grooves 22. The grooves 22, according to FIG. 6, have passages 36, which are formed by the channels 53. This tangential inlet causes a rotation of the water in the rotation chamber 54, which is advantageous from a fluidics perspective. It specifically permits the prevention of noises.

Figure 5:
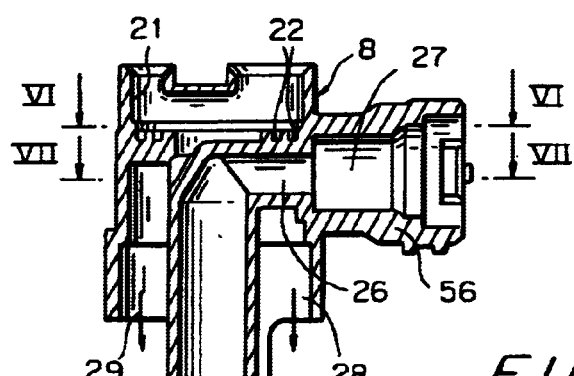
FIG. 5 shows a section through the housing of the fill valve assembly.
Figure 5:
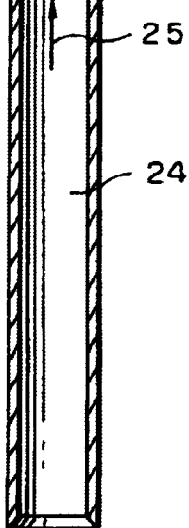
Figure 8:
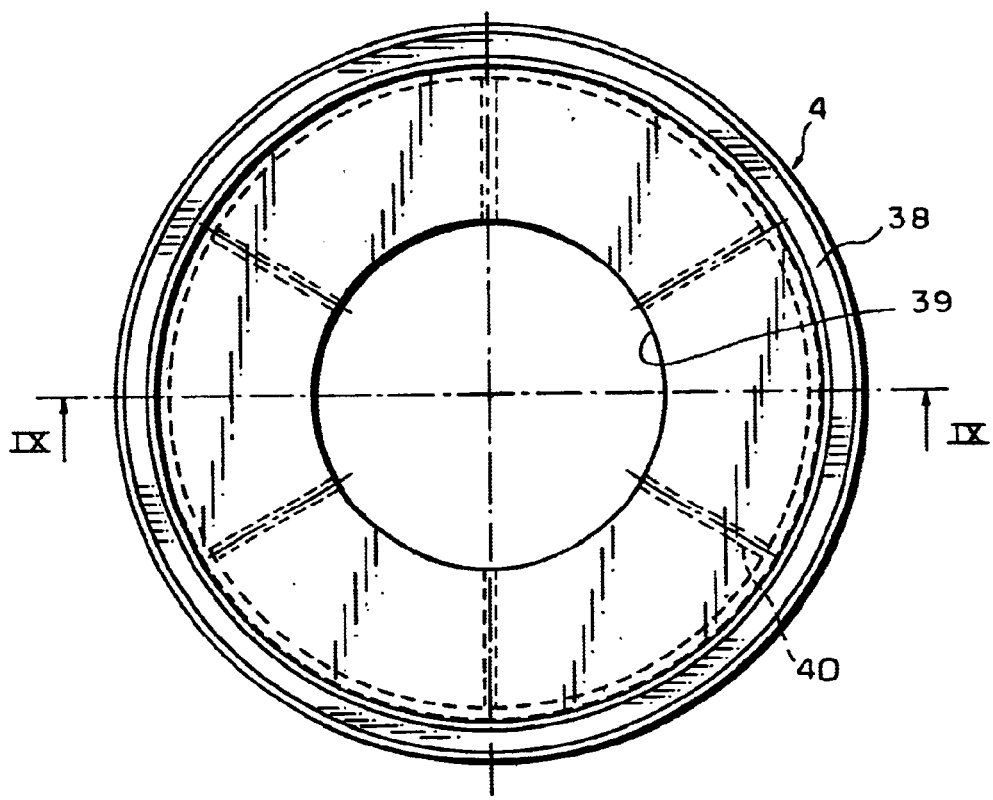
FIG. 8 is a view of the flap.
Figure 9:
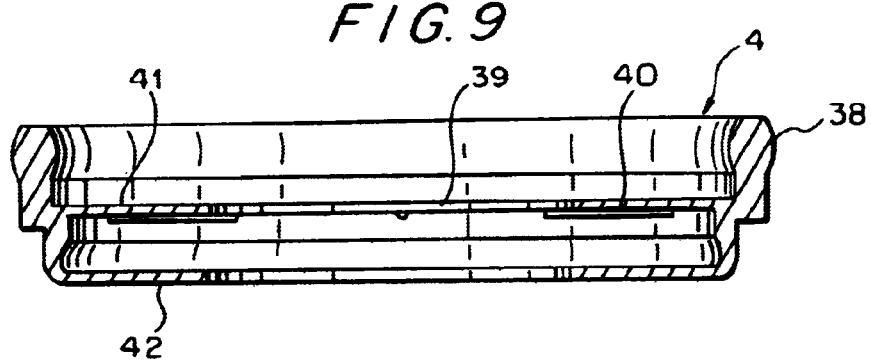
FIG. 9 is a section along the line VIIII—VIIII of FIG. 8.
Figure 10:
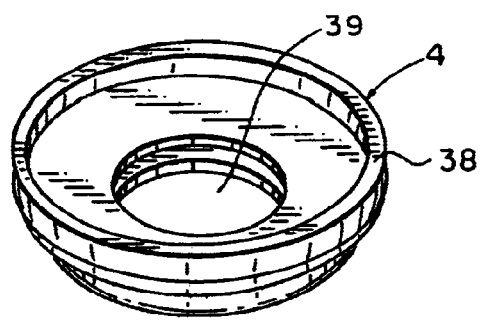
FIG. 10 is a three-dimensional view of the flap.
Figure 11:
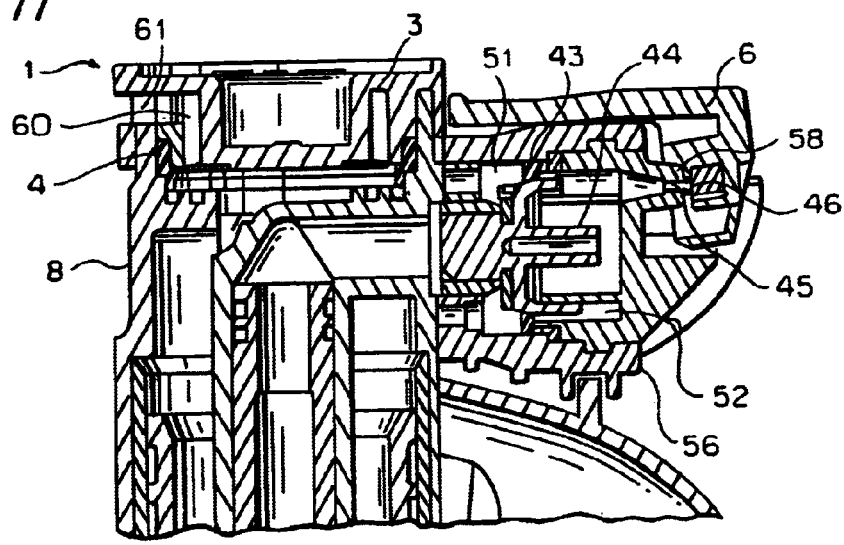
FIGS. 11 through 13 show sections through the upper portion of the fill valve assembly to describe the function of the means for preventing a backflow.
Figure 13:
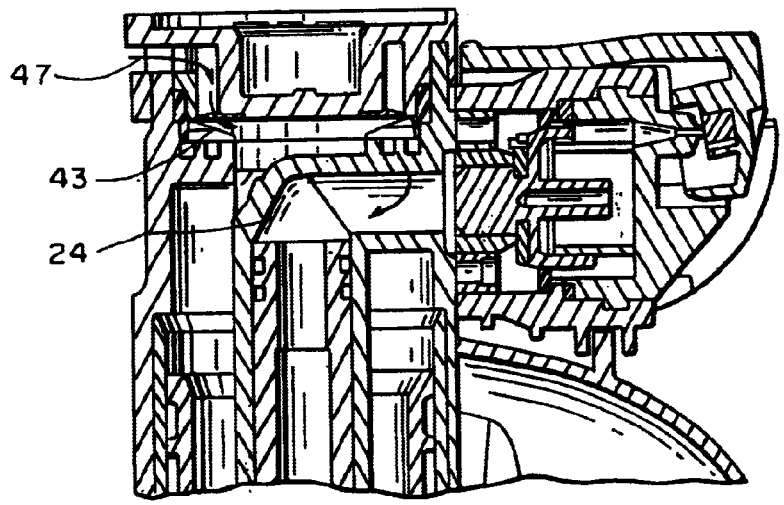

The housing 8, according to FIG. 5, has on its upper side a recess 21, into which a flap 4 and a cover 5 are removably inserted. The flap 4 is wedged into the housing 8 with the cover 3. The flap 4 is manufactured of a rubber-elastic material and designed according to FIGS. 8 though 10. As can be seen, the flap 4 is designed annular and has, for its sealing fastening, an edge 38 as well as a centrical passage 39. The passage 39 is formed by two lips 41 and 42 that are integrally provided on the edge at a distance to one another and each form a sealing diaphragm. The lip 41 is reinforced by radial ribs 40. When the diaphragm valve 50 is closed, the lip 41 closes an annular chamber 60 that is essentially formed by the cover 3 and the housing 8 and which, according to FIG. 11, is connected to the ambient atmosphere with a lateral radial opening 61. In the initial position according to FIG. 11, the lip 41 seals the annular chamber 60 from the bottom. The lower lip 42, according to FIG. 11, in the initial position covers the grooves 22 and seals them towards the top. If the valve is open, however, the rubber-elastic lip 42 is lifted off the grooves 22 according to FIG. 12, so that the rotation chamber 54 is formed and water, according to FIG. 12, enters in the direction of the arrow 48 into a channel 28, which extends coaxially to the inlet pipe 17. In it, the water flows vertically down, as indicated by the arrows 29 in FIG. 12. In the rotation chamber 54 the water first rotates, according to FIG. 6, in the circumferential direction according to the arrows 37 and then enters into a passage 31 in the direction of the arrow 32 and lastly into the channel 28. The annular chamber 60 continues to be sealed by the lip 41. If a negative pressure occurs in the water supply, air enters, according to FIG. 13, through the opening 21 and into the annular chamber 60 in the direction of the arrow 27. The drawn in air causes the lip 41 to be flipped down as shown in FIG. 13, and, consequently, the annular chamber 60 to be connected to the channel 28. This causes the water supply to be interrupted and water that is present in the flush tank thus cannot be siphoned into the inlet pipe 17. Preventing such a backflow of flush water is necessary to prevent a contamination of the water from the main. The flap 4 meets this requirement with comparatively simple means. The flap 4 can easily be exchanged by removing the cover 3. Likewise, the housing 8 is accessible from the top after the cover 3 has been lifted off and can be cleaned.

The housing 8 has an integral connection piece 23 that is connected to the rotation chamber 54 when the diaphragm valve 50 is open. When the diaphragm valve 50 is open, a portion of the water that is rotating in the rotation chamber 54 enters through the connection piece 23 in the direction of the arrow 62 (FIG. 6) into a pipe not shown here, through which this water enters into the trap that is not shown here of the toilet bowl. In this manner the trap, which was emptied during the siphoning process, is refilled. When the valve is open, in addition to the flush tank, the trap of the toilet bowl is thus also refilled. The connection piece 23 is required only where a siphoning trap exists.

What is claimed is:

1. A fill valve assembly for a flush tank, having a housing (8) that incorporates a vertical water-carrying channel (24) that leads from an inlet (49) that is to be fastened on the flush tank bottom (2) to a float-controlled diaphragm valve (50) that incorporates in a diaphragm (43) a passage for pressure equalization between a first chamber (51) in front of the diaphragm (43) and a second chamber (52) behind the diaphragm (43), and having a pilot valve (58) for actuating the diaphragm valve (50), wherein the diaphragm valve (50) is disposed laterally on the housing (8), wherein the water-carrying channel (24), at an upper end, leads into a horizontal passage (26) and wherein the first chamber (51) leads into an upwardly extending channel (53) and into a rotation chamber (54) for preventing water noises as water flows through the rotation chamber and into the flush tank and wherein the housing (8) has at a lower end means (16, 18) for fastening the valve assembly at the bottom of the flush tank.

2. A fill valve assembly according to claim 1, wherein when the diaphragm valve (50) is open, the rotation chamber (54) is connected to a connection piece (23), which is to be connected to a pipe for refilling a trap.

3. A fill valve assembly according to claim 1, wherein the outlet channel (28) is disposed coaxially to an inlet pipe (17).

4. A fill valve assembly for a flush tank having a housing (8) that incorporates a vertical water-carrying channel (24) that leads from an inlet (49) that is to be fastened on the flush tank bottom (2) to a diaphragm valve (50) that incorporates a first chamber (51) in front of a diaphragm (43) and a second chamber (52) behind the diaphragm (43), wherein the first chamber (51) is an annular chamber that extends in a vertical plane and is disposed laterally on the housing (8), which, when the diaphragm valve (50) is open, leads tangentially into a rotation chamber (54) that extends in a horizontal plane for preventing water noises as water flows through the rotation chamber and into the flush tank, wherein the water-carrying channel (24), at an upper end, leads into a horizontal passage (26) and wherein an annular outlet channel (28) is disposed downstream from the rotation chamber (54) and wherein the housing (8) has at a lower end means (16, 18) for fastening the valve assembly at the bottom of the flush tank.

5. A fill valve assembly according to claim 4, wherein the first chamber (51) leads into an upwardly extending channel (53) and into a rotation chamber (54).

6. A fill valve assembly according to any of claims 4, wherein the rotation chamber (54) has at least one annular groove (22) that is open towards the top.

7. A fill valve assembly according to claim 4, wherein means (4) to prevent a backflow in case of a negative pressure are disposed in the rotation chamber (54).

8. A fill valve assembly according to claim 7, wherein the means (4) to prevent a backflow incorporate a flexible lip (41), which, in its initial position, seals from the bottom an annular chamber (60) that is open towards the outside.

9. A fill valve assembly according to claim 7, wherein the means (40) prevent a backflow incorporates a flexible lip (42) that closes the rotation chamber (54) when the diaphragm valve (50) is closed and a negative pressure exists.

10. A fill valve assemble according to claim 7, wherein the means (4) to prevent a backflow are designed as a flap that closes the rotation chamber (54) to the outside when the diaphragm valve (50) is open.

11. A fill valve assembly according to claim 7, wherein the means (4) to prevent a backflow are designed annular with a centrical passage (39).

12. A fill valve assembly according to claim 7, wherein the means (4) prevent a backflow are fixed on the housing (8) by means of a covers (3).

13. A fill valve assembly according to claim 4, wherein the outlet channel (28) is disposed coaxially to an inlet pipe (17).

* * * * *